United States Patent
Seol

(10) Patent No.: US 9,050,899 B2
(45) Date of Patent: Jun. 9, 2015

(54) ELECTRIC VEHICLE

(71) Applicant: Samsung SDI Co. Ltd., Yongin-si, Gyeonggi-do (KR)

(72) Inventor: Ji-Hwan Seol, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 13/711,587

(22) Filed: Dec. 11, 2012

(65) Prior Publication Data

US 2013/0234629 A1    Sep. 12, 2013

Related U.S. Application Data

(60) Provisional application No. 61/608,510, filed on Mar. 8, 2012.

(51) Int. Cl.
| | |
|---|---|
| *H02P 1/00* | (2006.01) |
| *B60L 11/18* | (2006.01) |
| *B60L 7/16* | (2006.01) |
| *B60L 7/18* | (2006.01) |
| *B60L 15/00* | (2006.01) |
| *B60L 15/20* | (2006.01) |

(52) U.S. Cl.
CPC .............. *B60L 11/1805* (2013.01); *B60L 7/16* (2013.01); *B60L 7/18* (2013.01); *B60L 15/007* (2013.01); *B60L 15/20* (2013.01); *B60L 2220/14* (2013.01)

(58) Field of Classification Search
USPC ......... 318/599, 811, 139, 362, 374, 375, 376, 318/432; 320/116, 117; 180/65.1, 65.2
See application file for complete search history.

(56) References Cited

U.S. PATENT DOCUMENTS

| | | | | |
|---|---|---|---|---|
| 5,583,406 A | * | 12/1996 | Mutoh et al. | 318/376 |
| 2010/0019718 A1 | * | 1/2010 | Salasoo et al. | 320/103 |
| 2010/0096859 A1 | | 4/2010 | Tsai | |
| 2011/0001442 A1 | * | 1/2011 | Lee et al. | 318/139 |

FOREIGN PATENT DOCUMENTS

| | | |
|---|---|---|
| KR | 10-0235580 B1 | 9/1999 |
| KR | 10-2009-01323 77 | 12/2009 |
| KR | 10-2011-00758 17 | 7/2011 |

OTHER PUBLICATIONS

KIPO Decision of Refusal, Application No. 10-1999-0040894 published on Apr. 6, 2001, 3 pages.

* cited by examiner

*Primary Examiner* — Antony M Paul
(74) *Attorney, Agent, or Firm* — Christie, Parker & Hale LLP

(57) ABSTRACT

An electric vehicle includes a rechargeable battery, a wheel, a motor coupled to the wheel, a motor driver coupled to the motor and coupled to the battery, the motor driver being configured to drive the motor by discharging the battery in response to a motor driving signal during each of a plurality of supply periods and perform charging of the battery using recovery charging current generated by the motor during a plurality of idle periods, each of the idle periods being between two adjacent ones of the supply periods, and a controller coupled to the motor driver, the controller being configured to supply the motor driving signal to the motor driver during each of the supply periods, and control the motor driver to charge the battery during each of the idle periods.

20 Claims, 2 Drawing Sheets

ELECTRIC VEHICLE

CROSS-REFERENCE TO RELATED APPLICATION

This application claims priority to and the benefit of U.S. Provisional Application No. 61/608,510, filed on Mar. 8, 2012, in the U.S. Patent and Trademark Office, the entire content of which is incorporated herein by reference.

BACKGROUND

1. Field

An aspect of embodiments of the present invention relates to an electric vehicle.

2. Description of the Related Art

As problems of environmental pollution, resource depletion, etc. come into the limelight, interest in transportation means using electricity as power (instead of fossil fuel) has recently been increased.

Electric vehicles, such as an electric bicycle, an electric motorcycle, or an electric car, include a rechargeable battery and a motor for driving wheels by receiving power supplied from the battery.

To improve the efficiency of the battery, technology has been used for charging recovery energy generated in the motor by rotation of the wheels on a downhill road, which does not require the driving of the motor.

An energy recovery operation used in conventional electric vehicles will be described with reference to FIG. 1. In conventional electric vehicles, a motor is driven by supplying motor driving current Id to the motor in response to a motor driving signal Sd. When conventional electric vehicles correspond to a specific condition, such as when a brake is applied, or when the electric vehicle is on a downhill slope, recovery charging current Ir for the battery is generated by performing the energy recovery operation in the state in which the supply of the motor driving signal Sd is stopped.

However, when conventional electric vehicles do not correspond to the specific condition, the energy recovery operation is not performed, and therefore, battery charging efficiency is not high. In addition, the supply of the motor driving signal Sd is necessarily stopped to perform the energy recovery operation.

SUMMARY

Embodiments of the present invention provide electric vehicles capable of improving battery charging efficiency by automatically performing an energy recovery operation during an idle period between periodically supplied motor driving signals.

According to an aspect of embodiments of the present invention, there is provided an electric vehicle including a rechargeable battery, a wheel, a motor coupled to the wheel, a motor driver coupled to the motor and coupled to the battery, the motor driver being configured to drive the motor by discharging the battery in response to a motor driving signal during each of a plurality of supply periods and perform charging of the battery using recovery charging current generated by the motor during a plurality of idle periods, each of the idle periods being between two adjacent ones of the supply periods, and a controller coupled to the motor driver, the controller being configured to supply the motor driving signal to the motor driver during each of the supply periods, and control the motor driver to charge the battery during each of the idle periods.

The motor driver may be configured to provide motor driving current from the battery to the motor in response to the motor driving signal, and provide the recovery charging current from the motor to the battery during each of the idle periods.

The motor driver may include a plurality of transistors, and a plurality of recovery diodes, and ones of the recovery diodes may be connected in parallel to respective ones of transistors.

Pairs of the transistors may be coupled in series to each other, and may be coupled in parallel to the battery.

First electrodes of odd ones of the pairs of the transistors may be coupled to a positive electrode of the battery, and second electrodes of even ones of the pairs of the transistors may be coupled to a negative electrode of the battery.

Second electrodes of the odd ones of the pairs of the transistors may be coupled to first electrodes of corresponding even ones of the pairs of the transistors.

The motor may include first, second, and third three-phase coils coupled to the plurality of transistors.

First terminals of the first, second, and third three-phase coils may be coupled to each other.

A second terminal of each of the first, second, and third three-phase coils may be respectively coupled to a corresponding one of first, second, and third nodes respectively between ones of the pairs of the transistors.

The plurality of transistors may include first, second, third, fourth, fifth, and sixth transistors.

The first transistor and the fourth transistor may be turned on during a first period, and the second, third, fifth, and sixth transistors may be turned off during the first period, the first transistor and the sixth transistor may be turned on during a second period, and the second through fifth transistors may be turned off during the second period, the third transistor and the sixth transistor may be turned on during a third period, and the first, second, fourth, and fifth transistors may be turned off during the third period, the second transistor and the third transistor may be turned on during a fourth period, and the first, fourth, fifth, and sixth transistors may be turned off during the fourth period, the second transistor and the fifth transistor may be turned on during a fifth period, and the first, third, fourth, and sixth transistors may be turned off during the fifth period, the fourth transistor and the fifth transistor may be turned on during a sixth period, and the first, second, third, and sixth transistors may be turned off during the sixth period, the first through sixth transistors may be turned off during each of the idle periods, and each of the supply periods may include the first through sixth periods.

The motor driver may be configured to provide the motor driving current to the motor via the transistors.

The motor driver may be configured to turn off all of the transistors during each of the idle periods, and the recovery charging current may be provided to the battery via the recovery diodes.

The motor may include a brushless direct current (BLDC) motor.

The electric vehicle may include any one of an electric bicycle, an electric car, or an electric motorcycle.

The electric vehicle may further include a speed sensor coupled to the motor and coupled to the controller, the speed sensor may be configured to sense a speed of the motor, and may be configured to supply speed data to the controller.

The controller may be configured to adjust the supply periods corresponding to the speed data.

The plurality of the supply periods may be substantially constant so that a rotational frequency of the motor is maintained to be substantially constant.

When the electric vehicle travels at a constant speed, the controller may be configured to supply the motor driving signal at substantially regular intervals so that a rotational frequency of the motor is maintained to be substantially constant.

According to an aspect of embodiments of the present invention, there is provided an electric vehicle including a rechargeable battery, a wheel, a motor coupled to the wheel, a motor driver coupled to the motor and coupled to the battery, the motor driver being configured to drive the motor by discharging the battery in response to a motor driving signal during supply periods, and perform charging of the battery using recovery charging current generated by the motor during idle periods, a controller coupled to the motor driver, the controller being configured to periodically supply the motor driving signal to the motor driver during the supply periods, and control the motor driver to charge the battery during the idle periods, and a speed sensor coupled to the motor and to the controller, and configured to sense a speed of the motor, wherein the supply periods alternate with the idle periods when the speed sensor senses the speed to be equal to or greater than a reference value.

As described above, according to embodiments of the present invention, it is possible to provide an electric vehicle capable of improving battery charging efficiency by automatically performing an energy recovery operation during an idle period existing between periodically supplied motor driving signals.

BRIEF DESCRIPTION OF THE DRAWINGS

The accompanying drawings, together with the specification, illustrate exemplary embodiments of the present invention, and, together with the description, serve to explain aspects of embodiments of the present invention.

DETAILED DESCRIPTION

Figure 1:
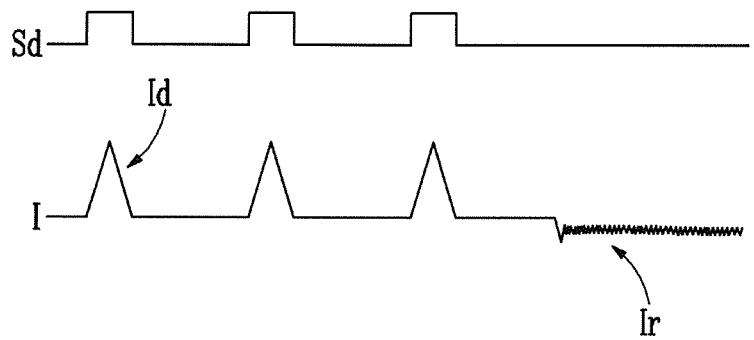
FIG. 1 is a timing diagram illustrating an energy recovery operation used in conventional electric vehicles.

Hereinafter, certain exemplary embodiments according to the present invention will be described with reference to the accompanying drawings. Here, when a first element is described as being coupled to a second element, the first element may be either directly coupled to the second element or indirectly coupled to the second element via one or more other elements. Further, some of the elements that are not essential to the complete understanding of the invention are omitted for clarity. Also, like reference numerals refer to like elements throughout.

Hereinafter, an electric vehicle according to embodiments of the present invention will be described with reference to the accompanying drawings.

Figure 2:
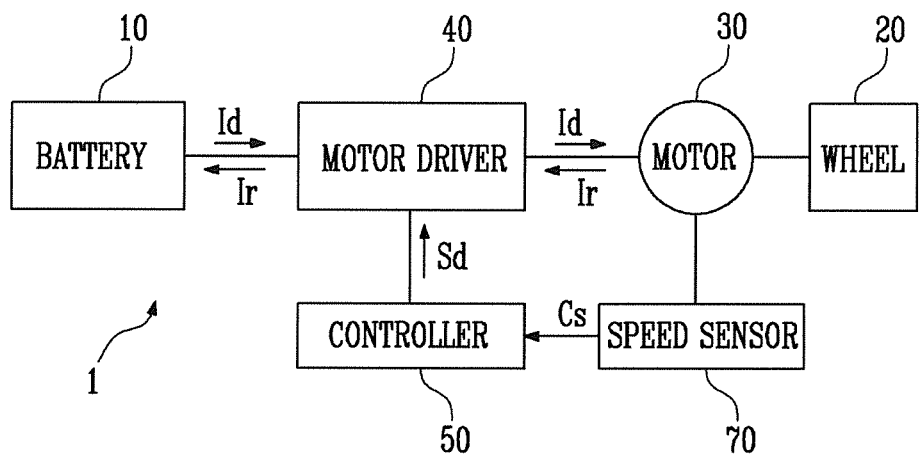
FIG. 2 is a block diagram showing an electric vehicle according to an embodiment of the present invention.
Figure 3:
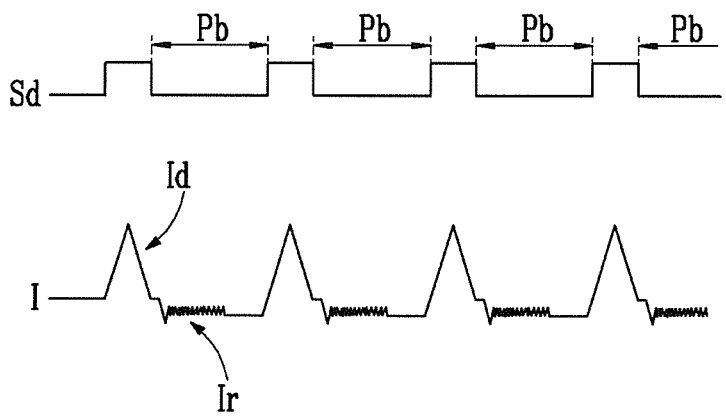
FIG. 3 is a timing diagram illustrating an energy recovery operation according to the embodiment shown in FIG. 2.

FIG. 2 is a block diagram showing an electric vehicle according to an embodiment of the present invention. FIG. 3 is a timing diagram illustrating an energy recovery operation according to the embodiment shown in FIG. 2.

Particularly, a motor driving signal Sd for driving a motor 30, and battery current I, which is classified as motor driving current Id or recovery charging current Ir according to the supply direction thereof, are shown in FIG. 3. The battery current I is shown based on the direction in which the battery current I is outputted from a positive (+) electrode of a battery 10.

Referring to FIG. 2, the electric vehicle 1 according to the present embodiment includes the battery 10, a wheel 20, the motor 30, a motor driver 40, and a controller 50. Although the electric vehicle 1 may be, for example, an electric bicycle, an electric motorcycle, an electric car, etc., the present invention is not limited thereto. That is, the electric vehicle 1 may be one of any and all vehicles using electricity as a power source.

The battery 10 may be a secondary battery that may be discharged to drive the motor 30, or that may be charged by recovery energy generated from the motor 30. For example, the battery 10 may be implemented as a nickel-cadmium battery, a nickel metal hydride battery, a lithium ion battery, a lithium polymer battery, etc. However, it will be apparent to one skilled in the art that a rechargeable secondary battery having another configuration may be used as the battery 10.

The wheel 20 enables the movement (e.g., linear, or directional, movement) of the electric vehicle 1 through the rotation thereof. Generally, two wheels are mounted to an electric bicycle or electric motorcycle, and four wheels are mounted to an electric vehicle. However, the number of wheels vary depending on the type of the electric vehicle 1. The wheel 20 is mechanically coupled to the motor 30 to be rotated by receiving a driving force from the motor 30, and enables recovery energy to be generated from the motor 30 by providing a rotary force.

The motor 30, which may be a brushless direct current (BLDC) motor, is a combined generator and motor, and may be driven by the driving current Id provided from the battery 10 through the motor driver 40, or may generate recovery energy from rotation of the wheel 20.

The recovery charging current Ir generated through a generation function of the motor 30 may be provided to the battery 10 through the motor driver 40. The motor driver 40 may control a driving operation or generation operation (energy recovery operation) of the motor 30 in response to a signal supplied from the controller 50.

When a motor driving signal Sd is periodically supplied from the controller 50, the motor driver 40 drives the motor 30 by discharging the battery 10 in response to the motor driving signal Sd. The motor driver 40 may provide (to the motor 30) the motor driving current Id from the battery 10 in response to the motor driving signal Sd. The motor driver 40 may charge the battery 10 by providing the battery 10 with the recovery energy generated through the generation operation of the motor 30 during an idle period Pb, the idle period Pb being between periodically supplied motor driving signals Sd. Further, the motor driver 40 may provide the battery 10 with the recovery charging current Ir generated from the motor 30 during the idle period Pb.

The controller 50 controls the motor driver 40, and may provide the motor driving signal Sd to the motor driver 40. When the electric vehicle 1 reaches a reference speed (e.g., a predetermined speed) on a generally flat road, the controller 50 may supply the motor driving signal Sd to the motor driver 40 at a certain frequency (e.g., periodically, and along a certain period) so that the rotational frequency of the motor 30 is substantially constantly maintained.

In the present embodiment, the electric vehicle has a speed sensor 70 for sensing a speed of the motor 30, so that the speed sensor 70 can supply speed data Cs of the motor 30 to the controller 50. Thus, the controller 50 can set the supply period of the motor driving signal Sd with reference to the speed data Cs supplied from the speed sensor 70. Accordingly, the controller 50 can control the speed of the electric vehicle 1.

As the motor driving signal Sd is intermittently supplied, there exists an idle period Pb in which the motor 30 is not driven. The controller 50 may control the motor driver 40 so that the battery 10 can be charged during the idle period Pb.

In the present embodiment, the controller 50 may control the motor driver 40 with reference to the speed data Cs supplied from the speed sensor 70 so that the battery 10 can be charged during the idle period Pb only when the motor 30 is driven at the aforementioned speed (e.g., the predetermined speed) or more.

Figure 4:
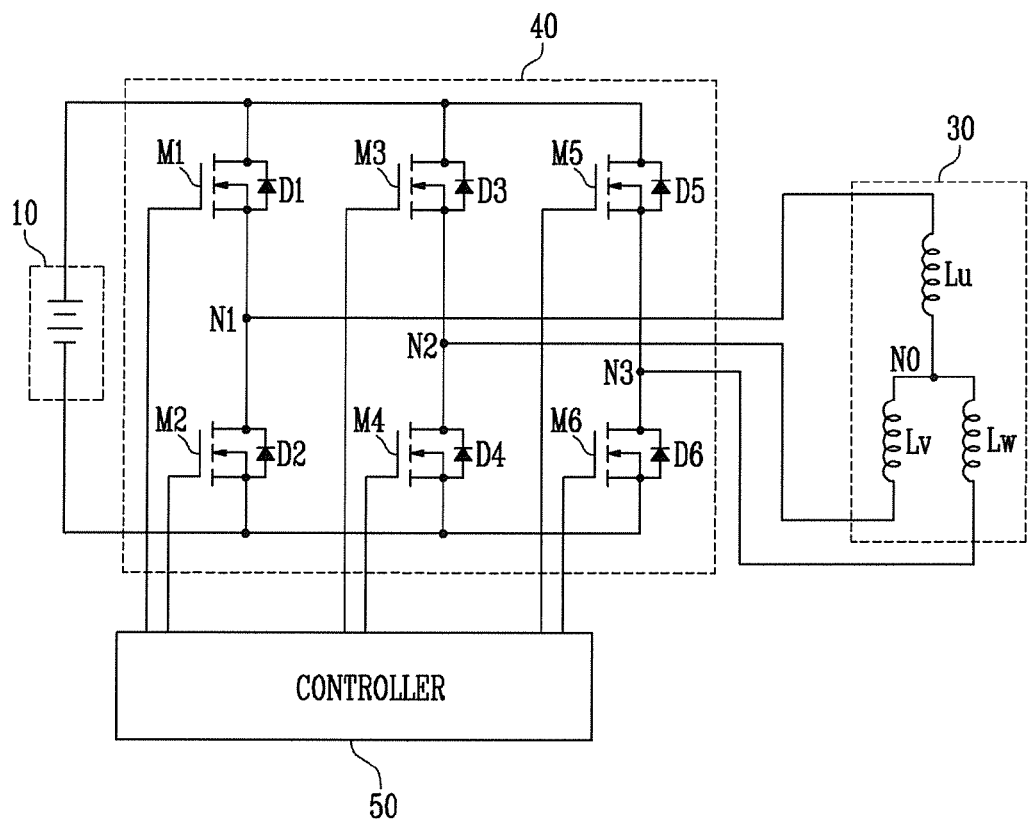
FIG. 4 is a circuit diagram showing a detailed configuration of a motor driver according to the embodiment shown in FIG. 2.

FIG. 4 is a circuit diagram showing a configuration of the motor driver according to an embodiment of the present invention. Referring to FIG. 4, the motor driver 40 according to the present embodiment may include a plurality of transistors M1, M2, M3, M4, M5 and M6, and recovery diodes D1, D2, D3, D4, D5 and D6 coupled in parallel to respective ones of the transistors M1, M2, M3, M4, M5 and M6.

The first and second transistors M1 and M2 are coupled in series with each other and coupled to the battery 10. Similarly, the third and fourth transistors M3 and M4 are coupled in series to each other, and the fifth and sixth transistors M5 and M6 are coupled in series to each other, so as to be coupled to the battery 10. Furthermore, first electrodes (e.g., drain electrodes) of the first, third and fifth transistors M1, M3 and M5 may be commonly coupled to a positive (+) electrode of the battery 10, and second electrodes (e.g., source electrodes) of the second, fourth and sixth transistors M2, M4 and M6 may be commonly coupled to a negative (−) electrode of the battery 10. A second electrode of the first transistor M1 may be coupled to a first electrode of the second transistor M2, a second electrode of the third transistor M3 may be coupled to a first electrode of the fourth transistor M4, and a second electrode of the fifth transistor M5 may be coupled to a first electrode of the sixth transistor M6.

In the present embodiment, one terminal of three-phase coils Lu, Lv, and Lw of the motor 30 is coupled to a common node N0. The other terminal of the u-phase coil Lu is coupled to another common node N1 between the first and second transistors M1 and M2, the other terminal of the v-phase coil Lv is coupled to a third common node N2 between the third and fourth transistors M3 and M4, and the other terminal of the w-phase coil Lw is coupled to a fourth common node N3 between the fifth and sixth transistors M5 and M6.

The recovery diodes D1, D2, D3, D4, D5 and D6 are coupled in parallel to the respective transistors M1, M2, M3, M4, M5 and M6, and enable current to flow from the second electrodes to the first electrodes of the transistors M1, M2, M3, M4, M5 and M6, respectively.

Figure 5:
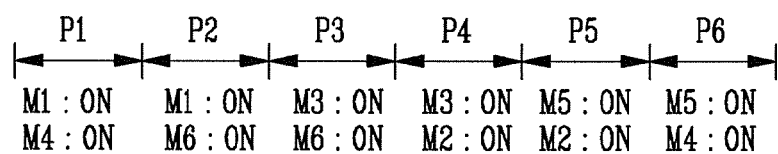
FIG. 5 illustrates an operation of the motor driver according to the embodiment shown in FIG. 4, the motor driver being controlled in response to a motor driving signal.

FIG. 5 illustrates an operation of the motor driver controlled in response to a motor driving signal. Particularly, the on/off state of each of the transistors controlled in response to the motor driving signal Sd provided from the controller 50 is shown in FIG. 5. Referring to FIG. 5, the first and fourth transistors M1 and M4 are turned on, and the other transistors are turned off, by the motor driving signal Sd supplied to the controller 50 during a first period P1. Thus, the motor driving current Id flows along the path from the positive (+) electrode of the battery 10 to the negative (−) electrode of the battery 10 via the first transistor M1, the u-phase coil Lu, the v-phase coil Lv and the fourth transistor M4.

The first and sixth transistors M1 and M6 are turned on, and the other transistors are turned off, by the motor driving signal Sd supplied to the controller 50 during a second period P2. Thus, the motor driving current Id flows along the path from the positive (+) electrode of the battery 10 to the negative (−) electrode of the battery 10 via the first transistor M1, the u-phase coil Lu, the w-phase coil Lw and the sixth transistor M6.

The third and sixth transistors M3 and M6 are turned on and the other transistors are turned off by the motor driving signal Sd supplied to the controller 50 during a third period P3. Thus, the motor driving current Id flows along the path from the positive (+) electrode of the battery 10 to the negative (−) electrode of the battery 10 via the third transistor M3, the v-phase coil Lv, the w-phase coil Lw and the sixth transistor M6.

The third and second transistors M3 and M2 are turned on and the other transistors are turned off by the motor driving signal Sd supplied to the controller 50 during a fourth period P4. Thus, the motor driving current Id flows along the path from the positive (+) electrode of the battery 10 to the negative (−) electrode of the battery 10 via the third transistor M3, the v-phase coil Lv, the u-phase coil Lu and the second transistor M2.

The fifth and second transistors M5 and M2 are turned on and the other transistors are turned off by the motor driving signal Sd supplied to the controller 50 during a fifth period P5. Thus, the motor driving current Id flows along the path from the positive (+) electrode of the battery 10 to the negative (−) electrode of the battery 10 via the fifth transistor M5, the w-phase coil Lw, the u-phase coil Lu and the second transistor M2.

The fifth and fourth transistors M5 and M4 are turned on and the other transistors are turned off by the motor driving signal Sd supplied to the controller 50 during a sixth period P6. Thus, the motor driving current Id flows along the path from the positive (+) electrode of the battery 10 to the negative (−) electrode of the battery 10 via the fifth transistor M5, the w-phase coil Lw, the v-phase coil Lv and the fourth transistor M4.

That is, the controller 50 supplies the motor driving signal Sd, so that the motor driver 40 can be controlled as described above during the period in which the motor driving signal Sd is supplied. Accordingly, it is possible to perform the driving operation of the motor 30 for rotating the wheel 20.

The controller 50 repeats the first to sixth periods P1 to P6 during the supply period of the motor driving signal Sd, so that the motor 30 can be driven through the charging of the battery 10. However, the controller 50 supplies the motor driving signal Sd along a certain period (e.g., periodically, and at a certain rate) so that the rotational frequency of the motor 30 is substantially constantly maintained. In this case, the controller 50 may control the motor driver 30 so that the motor 30 performs a generation operation during the idle period Pb in which the motor driving signal Sd is not supplied. To this end, the controller 50 may turn off all the transistors M1, M2, M3, M4, M5 and M6 included in the motor driver 40 so as to cut off the motor driving current Id during the idle period Pb. Thus, although the motor driving current Id is cut off during the idle period, the recovery charging current Ir generated by the wheel 20 (rotation of which being maintained by an inertial force) and the generation operation of the motor 30 coupled to the wheel can be provided to the positive (+) electrode of the battery 10 via the recovery diodes D1, D2, D3, D4, D5 and D6.

Accordingly, since the battery 10 receives the recovery charging current Ir supplied during the idle period Pb between periodically supplied motor driving signals Sd, it is possible to perform an automatic charging operation while constantly maintaining the speed of the electric vehicle 1, thereby improving battery charging efficiency.

While embodiments of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electric vehicle comprising:
   a rechargeable battery;
   a wheel;
   a motor coupled to the wheel;
   a motor driver coupled to the motor and coupled to the battery, the motor driver being configured to:
   drive the motor by discharging the battery in response to a motor driving signal during each of a plurality of supply periods; and
   perform charging of the battery using recovery charging current generated by the motor during a plurality of idle periods, each of the idle periods being between two adjacent ones of the supply periods; and
   a controller coupled to the motor driver, the controller being configured to:
   supply the motor driving signal to the motor driver during each of the supply periods; and
   control the motor driver to charge the battery during each of the idle periods.

2. The electric vehicle of claim 1, wherein the motor driver is configured to:
   provide motor driving current from the battery to the motor in response to the motor driving signal; and
   provide the recovery charging current from the motor to the battery during each of the idle periods.

3. The electric vehicle of claim 1, wherein the motor driver comprises:
   a plurality of transistors; and
   a plurality of recovery diodes, and
   wherein ones of the recovery diodes are connected in parallel to respective ones of transistors.

4. The electric vehicle of claim 3, wherein pairs of the transistors are coupled in series to each other, and are coupled in parallel to the battery.

5. The electric vehicle of claim 4, wherein first electrodes of odd ones of the pairs of the transistors are coupled to a positive electrode of the battery, and
   wherein second electrodes of even ones of the pairs of the transistors are coupled to a negative electrode of the battery.

6. The electric vehicle of claim 5, wherein second electrodes of the odd ones of the pairs of the transistors are coupled to first electrodes of corresponding even ones of the pairs of the transistors.

7. The electric vehicle of claim 3, wherein the motor comprises first, second, and third three-phase coils coupled to the plurality of transistors.

8. The electric vehicle of claim 7, wherein first terminals of the first, second, and third three-phase coils are coupled to each other.

9. The electric vehicle of claim 8, wherein a second terminal of each of the first, second, and third three-phase coils is respectively coupled to a corresponding one of first, second, and third nodes respectively between ones of the pairs of the transistors.

10. The electric vehicle of claim 9, wherein the plurality of transistors comprises first, second, third, fourth, fifth, and sixth transistors.

11. The electric vehicle of claim 10, wherein the first transistor and the fourth transistor are turned on during a first period, and wherein the second, third, fifth, and sixth transistors are turned off during the first period,
    wherein the first transistor and the sixth transistor are turned on during a second period, and wherein the second through fifth transistors are turned off during the second period,
    wherein the third transistor and the sixth transistor are turned on during a third period, and wherein the first, second, fourth, and fifth transistors are turned off during the third period,
    wherein the second transistor and the third transistor are turned on during a fourth period, and wherein the first, fourth, fifth, and sixth transistors are turned off during the fourth period,
    wherein the second transistor and the fifth transistor are turned on during a fifth period, and wherein the first, third, fourth, and sixth transistors are turned off during the fifth period,
    wherein the fourth transistor and the fifth transistor are turned on during a sixth period, and wherein the first, second, third, and sixth transistors are turned off during the sixth period,
    wherein the first through sixth transistors are turned off during each of the idle periods, and
    wherein each of the supply periods comprises the first through sixth periods.

12. The electric vehicle of claim 3, wherein the motor driver is configured to provide the motor driving current to the motor via the transistors.

13. The electric vehicle of claim 3, wherein the motor driver is configured to turn off all of the transistors during each of the idle periods, and wherein the recovery charging current is provided to the battery via the recovery diodes.

14. The electric vehicle of claim 1, wherein the motor comprises a brushless direct current (BLDC) motor.

15. The electric vehicle of claim 1, wherein the electric vehicle comprises any one of an electric bicycle, an electric car, or an electric motorcycle.

16. The electric vehicle of claim 1, further comprising a speed sensor coupled to the motor and coupled to the controller,
    wherein the speed sensor is configured to sense a speed of the motor, and is configured to supply speed data to the controller.

17. The electric vehicle of claim 16, wherein the controller is configured to adjust the supply periods corresponding to the speed data.

18. The electric vehicle of claim 17, wherein the plurality of the supply periods is substantially constant so that a rotational frequency of the motor is maintained to be substantially constant.

19. The electric vehicle of claim 1, wherein, when the electric vehicle travels at a constant speed, the controller is configured to supply the motor driving signal at substantially regular intervals so that a rotational frequency of the motor is maintained to be substantially constant.

20. An electric vehicle comprising:
    a rechargeable battery;
    a wheel;
    a motor coupled to the wheel;
    a motor driver coupled to the motor and coupled to the battery, the motor driver being configured to:

drive the motor by discharging the battery in response to a motor driving signal during supply periods; and perform charging of the battery using recovery charging current generated by the motor during idle periods;

a controller coupled to the motor driver, the controller being configured to:

periodically supply the motor driving signal to the motor driver during the supply periods; and control the motor driver to charge the battery during the idle periods;

and a speed sensor coupled to the motor and to the controller, and configured to sense a speed of the motor, wherein the supply periods alternate with the idle periods when the speed sensor senses the speed to be equal to or greater than a reference value.

* * * * *